United States Patent
Randall (10) Patent No.: US 9,416,711 B1
(45) Date of Patent: Aug. 16, 2016

(54) EXHAUST ENERGY RECOVERY AND POLLUTION CONTROL SYSTEM FOR MARINE VESSEL

(71) Applicant: Peter Lee Randall, Davie, FL (US)

(72) Inventor: Peter Lee Randall, Davie, FL (US)

( * ) Notice: Subject to any disclaimer, the term of this patent is extended or adjusted under 35 U.S.C. 154(b) by 0 days.

(21) Appl. No.: 14/864,336

(22) Filed: Sep. 24, 2015

Related U.S. Application Data (60) Provisional application No. 62/121,292, filed on Feb. 26, 2015.

(51) Int. Cl.
| | |
|---|---|
| *F01N 5/02* | (2006.01) |
| *F01N 3/08* | (2006.01) |
| *F01N 3/04* | (2006.01) |
| *F01N 3/02* | (2006.01) |
| *F01N 13/00* | (2010.01) |

(52) U.S. Cl.
CPC ............... *F01N 5/02* (2013.01); *F01N 3/0205* (2013.01); *F01N 3/04* (2013.01); *F01N 3/08* (2013.01); *F01N 13/004* (2013.01); *F01N 2260/024* (2013.01)

(58) Field of Classification Search
USPC ........... 60/272, 274, 280, 286, 295, 298, 309, 60/310, 320; 422/168–173, 244, 186.11, 422/186.2, 186.19
See application file for complete search history.

(56) References Cited

U.S. PATENT DOCUMENTS

| | | | |
|---|---|---|---|
| 2,976,834 A | 3/1961 | Schleifer | |
| 3,072,458 A | 1/1963 | Page | |
| 3,242,914 A | 3/1966 | Benger | |
| 3,420,737 A | 1/1969 | Foure | |
| 4,306,614 A | 12/1981 | Maggiorana | |
| 4,552,537 A | 11/1985 | Haynes | |
| 5,009,622 A | 4/1991 | Dudney | |
| 5,368,096 A | 11/1994 | Williams | |
| 5,510,087 A | 4/1996 | Johnson | |
| 5,524,456 A | 6/1996 | Stokes | |

(Continued)

FOREIGN PATENT DOCUMENTS

| | | |
|---|---|---|
| WO | 9208541 | 5/1992 |
| WO | 2014080266 | 5/2014 |

OTHER PUBLICATIONS

Kjolholt, et al., "Assessment of possible impacts of scrubber water discharges on the marine environment" Danish Ministry of the Environment Environmental Protection Agency; Project No. 1431 (2012) Miljostyrelsen.

(Continued)

*Primary Examiner* — Binh Q Tran
(74) *Attorney, Agent, or Firm* — Mark Terry (57) ABSTRACT

An exhaust gas heat energy recovery and pollution control system for a marine vessel is disclosed. The system includes (a) an exhaust gas boiler that receives exhaust gases from a gas or fuel oil-burning internal combustion engine, (b) a variable capacity wet scrubbing system that sprays a mixture into the exhaust gases, (c) two or more condensing heat exchangers that receive exhaust gases, (d) a variable flow and variable pressure exhaust gas mover that facilitates movement of the exhaust gases, (e) a liquid collection and treatment system that collects liquid condensate, (f) one or more heat sinks to receive thermal energy from exhaust gases, (g) an interconnecting fluid conduit that allows for movement of exhaust gases, and (h) a control system communicatively coupled with a plurality of sensors, actuators, and external interfaces.

8 Claims, 4 Drawing Sheets

(56) References Cited

U.S. PATENT DOCUMENTS

| | | | |
|---|---|---|---|
| 5,534,230 A | 7/1996 | Johnson | |
| 5,787,821 A | 8/1998 | Bhat | |
| 5,820,830 A | 10/1998 | McIllroy | |
| 6,240,725 B1* | 6/2001 | Scappatura | F01N 3/005 60/274 |
| 6,347,969 B1 | 2/2002 | Takahashi | |
| 6,544,086 B2 | 4/2003 | Tscherne | |
| 6,748,906 B1 | 6/2004 | White | |
| 7,007,459 B2* | 3/2006 | Lee | B01D 53/864 60/278 |
| 7,055,576 B2 | 6/2006 | Fernstrum | |
| 7,266,943 B2* | 9/2007 | Kammel | B01D 53/9409 60/297 |
| 8,003,057 B2* | 8/2011 | Schwab | B01D 53/501 422/173 |
| 8,056,322 B2* | 11/2011 | Winkler | F01N 3/106 123/1 A |
| 8,500,893 B2 | 8/2013 | Peng | |
| 2010/0084111 A1 | 4/2010 | Jaeger | |
| 2010/0230506 A1 | 9/2010 | Henriksson | |
| 2014/0199221 A1 | 7/2014 | Suchak | |
| 2014/0248201 A1 | 9/2014 | Hansen | |

OTHER PUBLICATIONS

Hombravella, et al., "Study of Exhaust Gas Cleaning Systems for vessels to fulfill IMO III in 2016" Fachhochschule Kiel University of Applied Science European Project Semester (2011) Caterpillar.

Steam Plant Systems, Inc., "Product Description" CHX Heat Recover System.

Sullivan, Bob, et al., "Condensing Heat Exchangers Optimize Steam Boilers" Proceedings from the Fifth Industrial Energy Conservation Technology Conference vol. 1, 72-77 (1983).

"CHX—An American Technology CHX Teflon Covered Condensing Heat Exchangers for Flue Gas Heat Recovery".

Steam Plant Systems, Inc., "CHX Heat Recovery—The Solution" CHX Heat Recovery System.

Steam Plant Systems, Inc., "Steam Plant Systems, Inc. Power Plant Services".

Goel, Nipen, "Design and Performance Analyses of Condensing Heat Exchangers for Recovering Water and Waste Heat from Flue Gas" (2012) Theses and Dissertations. Paper 1164.

Heaphy, J. P., "Condensing Heat Exchanger Demonstration to Optimize Energy Efficiency and Pollution Control" (1995) Babcock & Wilcox.

Carrigan, J. F., "Condensing Heat Exchanger for Optimization of Energy Efficiency" (1995) Proceedings from the Seventeenth Industrial Energy Technology Conference, Houston, Texas, Babcock & Wilcox.

Butcher, Thomas A., "Condensing Economizers for Small Coal-Fired Equipment" (1994) Department of Applied Science Brookhaven National Laboratory Upton, New York.

Butcher, Thomas A., "Condensing Economizers for Efficiency Improvement and Emissions Control in Industrial Boilers" Babcock & Wilcox—Research and Development Division, U.S. Department of Energy.

The Glosten Associates, Inc., "Exhaust Gas Cleaning Systems Selection Guide" (2011) U.S. Department of Transportation.

MAN Diesel and Turbo, "Soot Deposits and Fires in Exhaust Gas Boilers".

Aalborg XS-TC78, "Waste heat recovery economizer after auxiliary engines" Aalborg Industries.

EMB/EME-HST, "Exhaust Gas Marine Boiler Exhaust Gas Marine Economiser" (2012) SAACKE Marine Systems, Saacke GmbH.

Bowman, "Exhaust Gas Heat Exchangers" Issue K, E.J. Bowman (Birmingham) Limited.

Babcock & Wilcox Company "Recovering Lost Heat and Reducing Pollutants—Upgrading the Condensing Heat Exchanger" Project Facts, United States Department of Energy.

United States Environmental Protection Agency, "Exhaust Gas Scrubber Washwater Effluent" (2011).

Resolution MEPC.184(59), "2009 Guidelines for Exhaust Gas Cleaning Systems" (2009).

Steuler Anlagenbau GmbH & Co. KG, "Flue Gas Purification for Heavy Fuel Oil Fired Engines".

Green Tech Marine, "Green Tech Marine Scrubber System" (2012).

Green Tech Marine, "GTM R15 Scrubber System" (2012).

Lloyd's Register "Understanding Exhaust Gas Treatment Systems, Guidance for Shipowners and Operators" (2012).

Wikipedia, "Flue-Gas Desulfurization".

Lloyd's Register "Exhaust Gas Scrubbers".

Wartsila Corporation, "Reducing Emissions from Shipping Wartsila's Solutions".

* cited by examiner

EXHAUST ENERGY RECOVERY AND POLLUTION CONTROL SYSTEM FOR MARINE VESSEL

CROSS-REFERENCE TO RELATED APPLICATIONS

This patent application claims priority to provisional application No. 62/121,292 filed Feb. 26, 2015 and titled EXHAUST ENERGY RECOVERY AND POLLUTION CONTROL SYSTEM FOR MARINE VESSEL. The subject matter of provisional application No. 62/121,292 is hereby incorporated by reference in its entirety.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

TECHNICAL FIELD

The present invention relates to the field of energy production and pollution control, and, more specifically, relates to exhaust energy recovery and pollution control systems for marine vessels.

BACKGROUND

Marine engines are used in a variety of different types of vessels ranging in size and application from small recreational runabouts to large ocean-going vessels. New marine engines must meet increasingly stringent emissions requirements, yet these engines continue to emit significant amounts of pollution, which contribute to serious public health problems. Examples of said pollution include oxides of sulfur, oxides of nitrogen, hydrocarbons, heavy metals, CO, CO2, and particulate matter, all of which are harmful to humans, as well as the environment. Recent environmental regulations have decreased the allowable levels of sulfur in marine fuel and allowable amounts of pollutant emissions from marine engines, thereby creating significant environmental and public health benefits by reducing pollution from marine engines. Thus, there is a need for more efficient, environmentally friendly marine engine systems.

Marine shipping, however, is an industry that demands profits. The marine shipping industry employs hundreds of thousands of workers globally and generates approximately $400 billion in revenue globally. The profit enjoyed by marine shipping companies depends on the efficiency with which their operations are carried out at sea. In light of high fuel and operating costs of vessels, ship owners and operators are employing extra measures to maintain desired profit levels. Since the energy efficiency of a ship depends mainly on the propulsion and auxiliary power plant of the ship, much of the focus on energy efficiency has been directed to marine engines. Increased energy efficiency also results in reduced fuel consumption which results in less emissions. Thus, there is a need for more efficient marine engines.

The prior art of marine vessel engine exhaust gas scrubbing is well represented and summarized by U.S. Pat. No. 8,038,774B2; U.S. Pat. No. 8,500,893; U.S. Patent Pub. No. 20140248201; and U.S. Patent Pub. No. 20100230506. Gas scrubbing occurs when large quantities of seawater or an alkali reagent solution are sprayed into the exhaust gas. Heat energy recovery, if any, uses an internal gas-liquid heat exchanger operated at gas temperatures well above the exhaust gas condensable gas dew point to prevent corrosion, or by using conventional liquid-liquid heat exchangers to cool process liquids, e.g., collected spray and any process condensate. The heat energy recovered, if any, is used internal to the scrubbing process, e.g., for visible exhaust gas plume reheat mitigation or to produce fresh water for internal scrubber use. Net usable energy use by the ship with prior art scrubbers increases 1.0%-3.5% of the engine fuel energy use because of the scrubber energy use and low offsetting energy recovery. This, in turn, increases fuel consumption and paradoxically increases emissions of pollutant un-scrubbed gases such as CO and CO2.

The advantages and benefits of hot gas heat recovery and scrubbing with condensing heat exchangers are well documented by U.S. Pat. No. 5,368,096, U.S. Pat. No. 5,510,087, U.S. Pat. No. 5,534,230, and others. Instead of avoiding heat recovery at exhaust gas temperatures near or at the dew point of condensable exhaust gases, condensation and the recovery of the latent heat of condensation, as well as sensible heat, is facilitated. This allows significant usable energy recovery, typically well in excess of the energy used by as much as 10%-15% of the fuel energy value, and an increase of overall fuel efficiency and potential decrease in CO and CO2 emissions. Additionally, the condensing action provides a significant gas scrubbing benefit. Addition of alkali reagent sprays as a secondary scrubbing agent further improves exhaust gas quality.

A major marine vessel engine manufacturer states that marine vessel engine exhaust gas contains 25% of the heat energy of the fuel consumed and a large amount of pollutants. A portion of that energy, e.g., 10%, can be recovered for use with high efficiency exhaust gas boilers. Prior art scrubbers reduce certain emissions but diminish net energy efficiency and increase other pollutants.

Many of the currently available marine engine systems increase efficiency of the marine engine system in a way that increases the cost of the system to an untenable price or that do not meet stringent governmental environmental standards. Further, some of the available systems that are more economical in price and/or more environmentally friendly, do not adequately recover heat waste energy from marine engine systems and therefore do not adequately increase the energy efficiency of the system. Therefore, what is needed is a system and method for improving upon the problems with the prior art, and more particularly for a more efficient and cost-effective way to increase the efficiency of marine engine systems in a way that is also environmentally friendly.

SUMMARY

An exhaust gas heat energy recovery and pollution control system for a marine vessel is disclosed. This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

The disclosed embodiments address deficiencies of the art in respect to heat propulsion systems for marine vessels. In one embodiment, an exhaust gas heat energy recovery and pollution control system for a marine vessel is disclosed. The system includes (a) an exhaust gas boiler that receives exhaust gases from a gas or fuel oil-burning internal combustion engine of 500 kW or more on the marine vessel, wherein the boiler produces usable steam-based power and heat from heat recovered from the exhaust gases, (b) a variable capacity wet scrubbing system that sprays a mixture into the exhaust gases, such that a temperature of the exhaust gases is lowered so as to prevent damage to a PTFE-based material, and wherein the mixture includes water and an optional reagent configured to remove or neutralize pollutants in the exhaust gases, (c) two or more condensing heat exchangers that receive exhaust gases, wherein the two or more condensing heat exchangers comprised of PTFE-based material that exhibits corrosion resistant and condensation promotion characteristics, wherein the two or more condensing heat exchangers produce usable power and heat from heat recovered from the exhaust gases, and wherein the reagent may additionally be added to exhaust gases exiting the two or more condensing heat exchangers, (d) a variable flow and variable pressure exhaust gas mover that facilitates movement of the exhaust gases via the exhaust gas boiler, the wet scrubbing system, the two or more condensing heat exchangers, and interconnecting conduits, (e) a liquid collection and treatment system that collects liquid condensate and spray from the two or more condensing heat exchangers and collection points, and adds a reagent configured to remove or neutralize pollutants in the liquid condensate and remove particulates, (f) one or more heat sinks to receive thermal energy from exhaust gases through the two or more condensing heat exchangers and exhaust gas boiler, (g) an interconnecting fluid conduit that allows for movement of exhaust gases between the internal combustion engine, the exhaust gas boiler, the wet scrubbing system, the two or more condensing heat exchangers, and the exhaust gas mover, wherein the interconnecting fluid conduit includes at least one mechanism for preventing backflow of fluid to the exhaust gas boiler and the internal combustion engine, and (h) a control system communicatively coupled with a plurality of sensors, control actuators, and external interfaces in the internal combustion engine, the exhaust gas boiler, the wet scrubbing system, the two or more condensing heat exchangers, an external power source for the system, the one or more heat sinks, the exhaust gas mover and the liquid collection and treatment system, wherein the control system collects data from the sensors and issues commands to the exhaust gas boiler, the wet scrubbing system, the two or more condensing heat exchangers, the exhaust gas mover and the liquid collection and treatment system based on the data received from the plurality of sensors.

This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope. Additional aspects of the disclosed embodiment will be set forth in part in the description which follows, and in part will be obvious from the description, or may be learned by practice of the disclosed embodiments. The aspects of the disclosed embodiments will be realized and attained by means of the elements and combinations particularly pointed out in the appended claims. It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute part of this specification, illustrate embodiments of the invention and together with the description, serve to explain the principles of the disclosed embodiments. The embodiments illustrated herein are presently preferred, it being understood, however, that the invention is not limited to the precise arrangements and instrumentalities shown, wherein.

DETAILED DESCRIPTION

The following detailed description refers to the accompanying drawings. Whenever possible, the same reference numbers are used in the drawings and the following description to refer to the same or similar elements. While disclosed embodiments may be described, modifications, adaptations, and other implementations are possible. For example, substitutions, additions or modifications may be made to the elements illustrated in the drawings, and the methods described herein may be modified by substituting reordering, or adding additional stages or components to the disclosed methods and devices. Accordingly, the following detailed description does not limit the disclosed embodiments. Instead, the proper scope of the disclosed embodiments is defined by the appended claims.

The disclosed embodiments improve upon the problems with the prior art by providing a more energy efficient engine system for a marine vessel. By optimizing the amount of exhaust heat energy that is recovered by the system, energy efficiency is increased. The disclosed embodiments further improve over the prior art by providing a more environmentally friendly system that greatly reduces pollution in emissions, such as carbon dioxide, carbon monoxide, oxides of sulfur, oxides of nitrogen, hydrocarbons, particulates, and heavy metals. The disclosed embodiments further improve over the prior art by reducing exhaust gas temperatures, which together with the gas mover may result in lower height and smaller dimension requirements for the exhaust stack, and less supporting structure, which lowers the weight of the marine vessel and lowers the center of gravity of the entire marine vessel, thereby contributing to energy efficiency and stability of the marine vessel. Further, lower exhaust gas temperatures and the gas mover may result in the ability to use lighter materials to construct the marine vessel and/or its supporting structure, thereby resulting in less fuel carriage and lower tankage for the marine vessel. Finally, the disclosed embodiments improve over the prior art by producing its own water from condensed combustion gas moisture, which reduces or eliminates the need to produce or use outside sources of water in the wet scrubbing and quench system 130.

Figure 1:
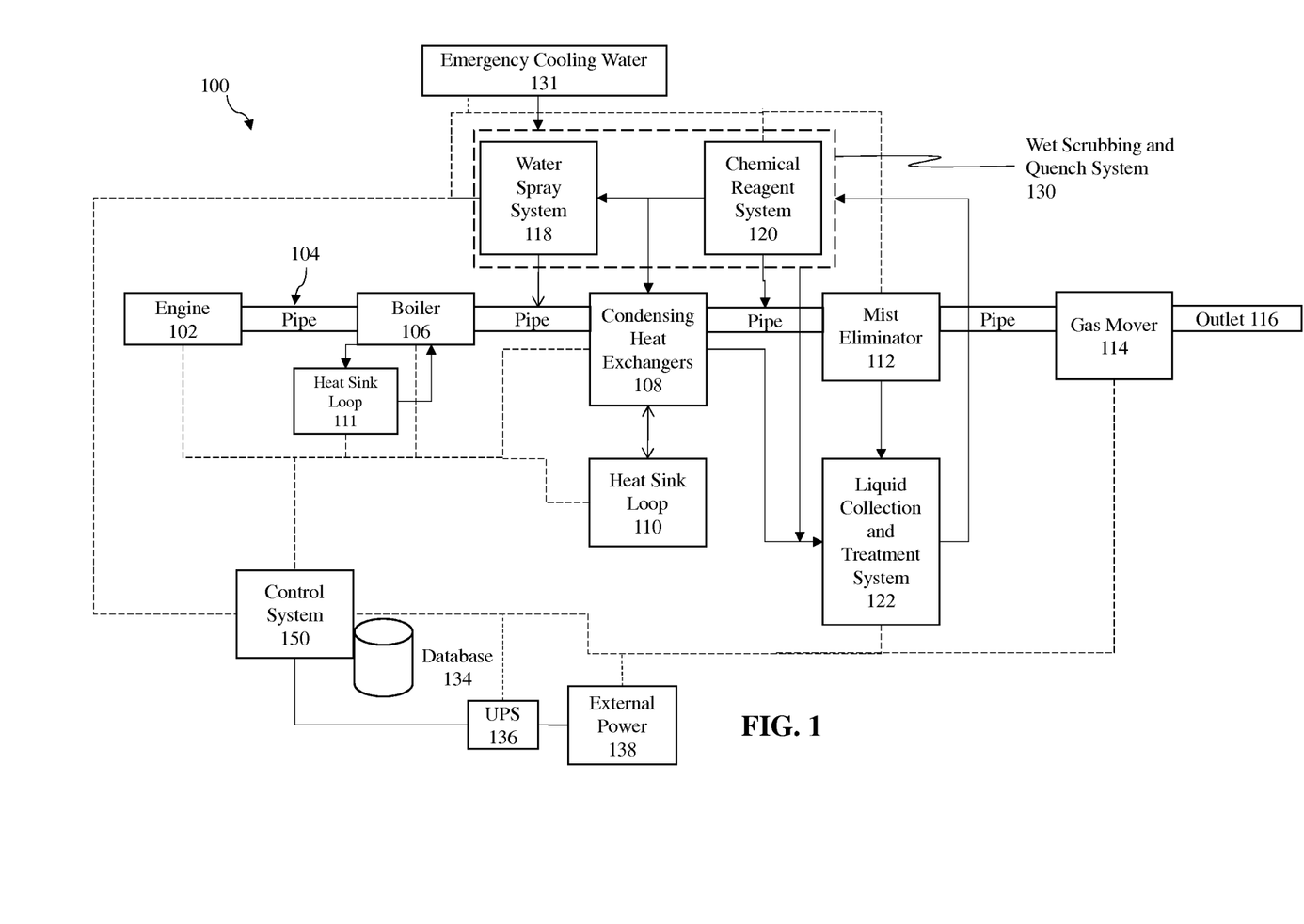
FIG. 1 is a block diagram showing the components of an exhaust gas heat energy recovery and pollution control system for a marine vessel, according to an example embodiment.

Referring now to the Figures, FIG. 1 is a block diagram showing the components of an exhaust gas heat energy recovery and pollution control system for a marine vessel, according to an example embodiment. In one embodiment, the exhaust gas heat energy recovery and pollution control system 100 for a marine vessel comprises an exhaust gas boiler 106 (or an economizer) that receives exhaust gases from a gas or fuel oil-burning internal combustion engine 102 of 500 kW or more on the marine vessel, wherein the boiler produces usable steam-based power and heat from heat recovered from the exhaust gases. An exhaust gas boiler may produce steam by using the sensible heat of the exhaust gases of the engine 102, thus saving thermal energy that otherwise would be lost. The exhaust gas boiler allows the exhaust gases to give up heat which is recycled for other uses. The exhaust gas boiler can be equipped with an economizer section, a super-heater section, and a steam soot blower to remove soot accumulations.

Pipe 104 and other blocks in FIG. 1 designated as a pipe represent interconnecting piping, ducting, and appurtenances used as conduits to transfer gases, liquid, heat, etc. via system 100. Pipe 104 may include exhaust gas pipes, ducting, insulation, and sheathing of conventional steel or FRP design and construction appropriate for the gas temperature and gas composition at the point of use. Pipe 104 may include baffles, diffusers, mist eliminators, and diverters to improve flow, mixing, or other functions. Any such item includes in the definition of "pipe" above shall be referred to generally as a conduit. Note that in one embodiment, an interconnecting fluid conduit includes at least one mechanism for preventing backflow of fluid, wherein said mechanism may be included in the pipe 104 between the boiler and the condensing heat exchanger.

The system 100 further comprises a variable capacity wet scrubbing system or water spray system 118 that sprays a mixture into the exhaust gases exiting the boiler 106, such that a temperature of the exhaust gases is lowered so as to prevent damage to the PTFE-based material or covering of the condensing heat exchanger 108 (alternatively, a PTFE-like material), and wherein the mixture includes water and an optional chemical reagent (provided by chemical reagent system 120) configured to remove or neutralize pollutants in the exhaust gases and remove particulates. Chemical reagents may also be added by system 118 to the gases exiting the one or more condensing heat exchangers. In this document, the term "PTFE-based" may refer to a component that comprises, is covered with, or is coated with, a PTFE material (such as Teflon® or Alwaflon® or the equivalent). Note that in one embodiment, water spray system 118 may be both a variable cooling (quench) system and a variable wet scrubbing system. In its role as a wet scrubbing system, system 118 may also incorporate chemical reagents from chemical reagent system 120. In this embodiment, chemical reagent system 120 may also be a wet scrubbing system that may inject chemical reagent into systems 118, 108, and 106 (after 108). As a byproduct, chemical reagent system 120 may provide incidental cooling of exhaust gases. The combination of elements 118 and 120 may be referred to as a wet scrubbing and quench system 130, as the term is well known in the relevant art. The system 100 may further comprise an emergency cooling water system 131 that produces water for input into the wet scrubbing and quench system on an emergency basis, such as when there is an unexpected loss of power.

The system 100 further comprises one or more condensing heat exchangers 108 that receive exhaust gases exiting the wet scrubbing system 118, wherein the one or more condensing heat exchangers comprise PTFE-based material that exhibits corrosion resistant and condensation promotion characteristics, and wherein the one or more condensing heat exchangers produce usable power from heat recovered from the exhaust gases. The PTFE-based material prevents corrosion of the heat exchanger by corrosive exhaust gases and condensates, and facilitates the formation of condensate on its surface under the proper conditions. In one embodiment, the condensing heat exchanger 108 comprises multiple discrete condensing heat exchangers wherein the gas side of consecutive condensing heat exchangers may be connected to each other by exhaust gas pipes or they may be directly connected as an assembled unit. In one embodiment, the system 100 further comprises a mist eliminator 112 as a piping appurtenance for eliminating any mist or vapor in the exhaust gases exiting the condensing heat exchanger 108.

The system 100 further comprises a variable flow and variable pressure exhaust gas mover 114 that facilitates movement of the exhaust gases via the exhaust gas boiler 106, the wet scrubbing system 118, the one or more condensing heat exchangers 108, the mist eliminator 112, and conduits 104. In one embodiment, the exhaust gas mover 114 comprises an induced draft fan, blower, or jet ejector, of conventional design and construction for the application. The system 100 further comprises an exhaust gas outlet 116 to the atmosphere.

The system 100 further comprises a liquid collection and treatment system 122 that collects liquid condensate and spray from the one or more condensing heat exchangers 108, the mist eliminator 112 and other collection points, and adds a chemical reagent configured to remove or neutralize pollutants in the liquid condensate and remove particulates. The system 122 includes a liquid collection system for collecting said liquid and may include non-corroding collection pans and trays, drains, sumps, pumps, piping, tanks, instrumentation, controls, and reservoirs. It is of conventional design and construction appropriate for the liquids and temperatures of the application. The system 122 also includes a collected liquid treatment system of conventional design to remove contaminants from the collected scrubbing liquids, adjust pH, separate and treat water for re-use, and separate and treat contaminants for safe handling and storage onboard and subsequent offload to shore side treatment facilities. The system 122 may provide water to the elements 118 and 120. Likewise, the wet scrubbing and quench system may provide liquid for input into the system 122.

The system further comprises a heat sink loop 110 for each of the one or more condensing heat exchangers 108. Each heat sink loop is a discrete, continuous heat sink loop for the boiler 106 and each respective condensing heat exchanger 108. Each heat sink loop includes, but is not limited to, a thermal fluid, a piping system with appropriate controls and appurtenances, insulation, pumps, heat exchangers, fluid conditioners, instrumentation, reservoirs, a normal usable heat load, and one or more heat sinks. Thermal fluids include, but are not limited to, water, water solutions, mineral oils, glycol solutions, organic refrigerants, and other fluids that are appropriate for the application. Usable heat loads include, but are not limited to: 1) heat engines, such as water-steam rancine cycle and organic rancine cycle, 2) crossover connections for backup and redundancy between heat sink loops with appropriate controls, thermal fluid, and heat exchangers, 3) conventional motor ship steam heating loads such as fuel oil heaters, fuel oil tanks, fuel oil separators, evaporative water makers, galley and laundry equipment, HVAC heaters, potable water heaters, sludge dryers, sludge settling tanks, and, 4) cargo tank and cargo hold heating. Heat sinks for unusable heat energy in the heat sink loops include, but are not limited to, open and closed loop seawater cooling, channel coolers, keel coolers, motor ship low temperature and high temperature cooling water systems, atmospheric air cooling, and combinations thereof. Heat sink temperature may fall into the range of seawater temperature, up to and including the engine high temperature cooling loop. FIG. 1 also shows that boiler 106 may also have its own heat sink loop 111.

In one embodiment, a heat sink loop includes one or more of the following: cargo, potable water making mechanisms, HVAC heaters, sludge tanks, galleys, process chem tanks, machinery heaters, hull heaters, miscellaneous heaters, HFO tanks, HFO settlers, HFO day tanks, HFO separators, water makers, boiler make up feeds, cargo tanks, livestock holds, cargo holds, laundries, pools, spas, and ORCs.

The system further comprises a control system 150 communicatively coupled with sensors, control actuators, and external interfaces in the internal combustion engine 102, the exhaust gas boiler 106, the wet scrubbing system 118, the one or more condensing heat exchangers 108, the exhaust gas mover 114 and the liquid collection and treatment system. The control system 150 may further be communicatively coupled with sensors and control actuators in the chemical reagent system 120 and the heat sink loops 110, 111. The dotted lines in FIG. 1 indicate communicative couplings between components. The control system 150 further collects data 302 (see FIG. 3) from sensors located in a variety of locations (including at the engine 102, boiler 106, gas mover 114, etc.) and issues commands 304 to one or more of the exhaust gas boiler, the wet scrubbing system, the one or more condensing heat exchangers, heat sink loops, the exhaust gas mover and the liquid collection and treatment system (as well as any other system to which the system 150 is communicatively coupled) based on the data received from the sensors. Said commands are configured to increase the energy efficiency and pollution control characteristics of the system 100. The control system 150 is further configured for collecting data from the sensors, calculating an amount, temperature, and formulation of the mixture to be injected by the wet scrubbing system 118 based on the sensor data, and transmitting a control signal to the wet scrubbing system 118, wherein the control signal is configured to command the wet scrubbing system 118 to inject the amount of mixture that was calculated.

In another embodiment, the control system 150 may further control the temperature of the mixture sprayed by system 118, as well as the formulation of the mixture (e.g., % NaOH or Mg(OH)2 aqueous solution). In addition, the control system 150 may control the gas mover 114 to adjust gas mover throughput. Also, the control system 150 may provide supervisory control and data acquisition (SCADA) control of standalone subsystems and equipment. SCADA is a system operating with coded signals over communication channels so as to provide control of remote equipment. In another embodiment, the control system 150 may further provide safety limit controls, such as a high temperature limit on gas entering the condensing heat exchanger 108, and/or limits for implementation in the event of a malfunction of one of the subsystems. In addition, the control system 150 may manage and coordinate the interaction of the component systems (102, 106, 108, 110, 111, etc.), such as, for example, reducing cooling by the spray system 118 as the dry cooling by the boiler 106 increases, and vice versa. Also, the control system 150 may manage, coordinate, and prioritize the heat sink loops 110, 111, such as prioritizing boiler steam generation over condensing heat exchanger potable water heating, etc.

In one embodiment, typical equipment, sensor, and operator inputs processed by control system 150 may include the following: on, off, standby, run, stop, auto, automatic, local, remote, override, tripped, overload, open, close, closed, hold, increase, decrease, range, percent of range, set point, fault, selected, temperature, pressure, fluid flow, relative humidity, pH, conductivity, differential, level, conductivity, aligned, not aligned, look up table address (value), alarm, analog value, digital value, and position. In another embodiment, typical commands processed by control system 150 may include the following: on, off, standby, run, stop, auto(matic), local, remote, override, trip, open, close, hold (value), increase (value), decrease (value), range, percent of range, set point, differential (value), revert, look up table address (value), analog value, digital value, and position.

Note that although FIG. 1 shows certain components located in particular locations and coupled with particular other components, the disclosed embodiments support placement of said components in various locations and in connection with a variety of other components.

In one embodiment, system 150 may be connected to an uninterruptable power supply (UPS) 136, which is an electrical apparatus that provides emergency power to a load when the input power source, typically mains power, fails. The UPS will provide near-instantaneous protection from input power interruptions, by supplying energy stored in batteries, supercapacitors, or flywheels. The UPS is typically used to protect the system when an unexpected power disruption could cause injuries, fatalities, serious disruption or data/energy loss. The UPS may be connected to an external power source 138, which may be another engine driven generator, etc. In another embodiment, the control system 150 includes (or may interface with) a main ship central monitoring alarm and control system and external user interfaces for interfacing with the crew. Control actuators and external interfaces provide an interface between users and the main ship central monitoring alarm and control system.

In one embodiment, system 150 may be one or more desktop computers, workstations, servers, smart phones, mobile phones, tablet computers, handheld computers, laptops, programmable controllers, or the like. Further, system 150 may include a database or repository 134, which may be a relational database comprising a Structured Query Language (SQL) database stored in a SQL server or a big data database. The repository serves data from a database 134, which is a repository for data used by system 150 during the course of operation of the disclosed embodiments. The database 134 may be distributed over one or more nodes or locations that are connected via a network. The database may include one or more stored values representing system parameters such as an amount of water and/or chemical reagent to inject by systems 118, 120, and 122, wherein the stored values correspond to sensor data.

In one embodiment, the stored values are embedded in one or more lookup tables. The lookup table may comprise a data structure comprising a list or chart wherein each line or row lists data values or ranges of data values for sensor data. The data values or ranges of data values in the lookup table correspond to sensor data that is read (see below). In one example, each line or row of the lookup table also includes a desired amount of water and/or chemical reagent that corresponds to the data values, or ranges, in that line or row. That is, the lookup table lists the desired amount of water and/or chemical reagent that should be injected by a particular system, in order to provide optimal efficiency, for certain sensor data values or ranges of sensor data values. Therefore, each line or row of the lookup table may be seen as an if-then statement wherein the if-portion of the statement corresponds to sensor data values or ranges of sensor data values and the then-portion of the statement corresponds to a desired amount of water and/or chemical reagent that should be injected by a particular system. In one embodiment, each system may be associated with one or more lookup tables—that is, each system may have one or more lookup tables that correspond to that specific system.

In one alternative, the data in the lookup table is designed to define an amount of water to be dispersed necessary to increase the humidity of the gases in said system to 100%, thereby enabling the condensation process of the system.

It should be noted that although FIG. 1 shows only the networked computer 150, the system of the disclosed embodiments supports any number of networked computing devices. Further, the system 150 includes program logic such as computer programs, mobile applications, executable files or computer instructions (including computer source code, scripting language code or interpreted language code that may be compiled to produce an executable file or that may be interpreted at run-time) that perform various functions of the disclosed embodiments.

Note that although system 150 is shown as a single and independent entity, in one embodiment, the functions of system 150 may be integrated with another entity, such as one of the systems 118 or 120. Further, system 150 and its functionality, according to a preferred embodiment, can be realized in a centralized fashion in one computer system or in a distributed fashion wherein different elements are spread across several interconnected computer systems.

Figure 2:
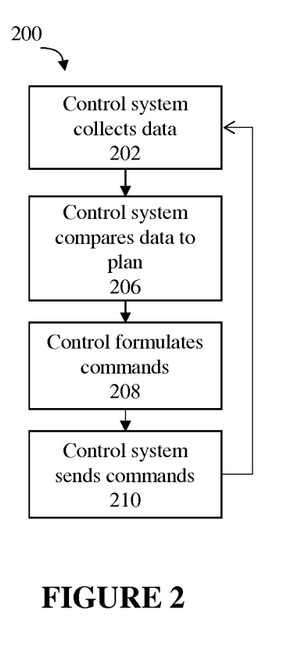
FIG. 2 is a block diagram illustrating a control flow used by the control and monitoring system of the exhaust gas heat energy recovery and pollution control system for a marine vessel, in accordance with one embodiment.
Figure 3:
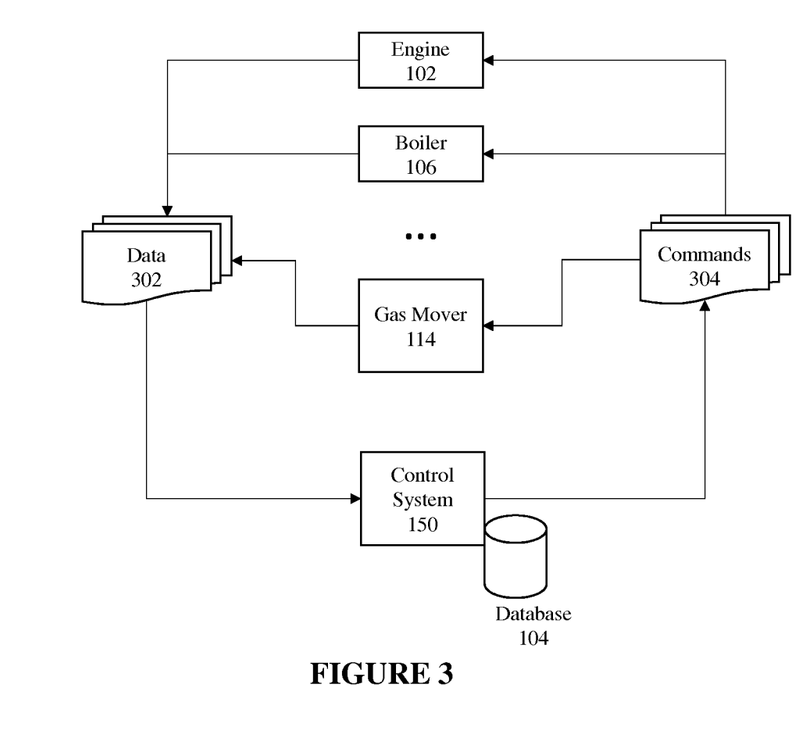
FIG. 3 is a block diagram illustrating the data flow used by the control system of the exhaust gas heat energy recovery and pollution control system for a marine vessel, in accordance with one embodiment.

The control process of the disclosed embodiments will now be described with reference to FIGS. 2-3. FIG. 2 is a block diagram illustrating a control flow used by the control and monitoring system of the exhaust gas heat energy recovery and pollution control system 100 for a marine vessel, in accordance with one embodiment. FIG. 3 is a block diagram illustrating the data flow used by the control system 150. FIG. 2 shows that in step 202 control system 150 collects sensor data 302 from a variety of sensors associated with engine 102, boiler 106, heat sink loop 111 (open loop, closed loop or any combination of the two), water spray system 118, chemical reagent system 120, condensing heat exchanger 108, heat sink loop 110, liquid collection and treatment system 122, and gas mover 114, as well as other sensors that may be located in the pipes 104 and outlet 116 (collectively referred to as components 102 through 122). Recall that control system 150 is communicatively coupled with components 102 through 122. In response, in step 206, the control system 150 may compare the received sensor data with a predefined operational plan that defines the desired operating parameters of the system 110. The predefined operational plan may be stored in database 134.

Recall that database 134 holds stored values embedded in one or more lookup tables. The lookup table may comprise a data structure comprising a list or chart wherein each line or row lists data values or ranges of data values for sensor data. The data values or ranges of data values in the lookup table correspond to sensor data that is read. For example, each line or row of the lookup table also includes a desired amount of water and/or chemical reagent that corresponds to the data values, or ranges, in that line or row. That is, the lookup table lists the desired amount of water and/or chemical reagent that should be injected by a particular system (such as systems 118 and 120), in order to provide optimal efficiency, for certain sensor data values or ranges of sensor data values. Therefore, each line or row of the lookup table may be seen as an if-then statement wherein the if-portion of the statement corresponds to sensor data values or ranges of sensor data values and the then-portion of the statement corresponds to a desired amount of water and/or chemical reagent that should be injected by a particular system. In one embodiment, each system may be associated with one or more lookup tables—that is, each system may have one or more lookup tables that correspond to that specific system.

In step 208, after consulting with any corresponding lookup tables, the control system 150 determines how the components 102 through 122 must be adjusted in order to achieve desired operating parameters of the predefined operational plan stored in database 134. In step 208, the control system 150 also formulates the commands that must be transmitted to said components in order to achieve said goal. In step 210, the control system 150 transmits said formulated commands 304 to the components 102 through 122.

Figure 4:
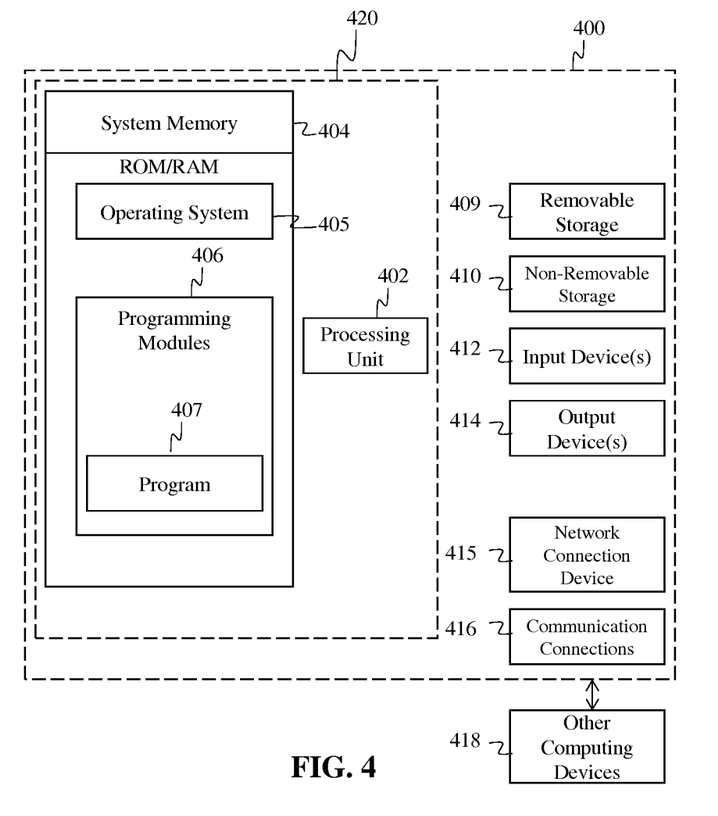
FIG. 4 is a block diagram of a system including an example computing device and other computing devices.

FIG. 4 is a block diagram of a system including an example computing device 400 and other computing devices. Consistent with the embodiments described herein, the aforementioned actions performed by 150 (as well as any other components that may be controlled by a computer, such as elements 102 through 122) may be implemented in a computing device, such as the computing device 400 of FIG. 4. Any suitable combination of hardware, software, or firmware may be used to implement the computing device 400. The aforementioned system, device, and processors are examples and other systems, devices, and processors may comprise the aforementioned computing device. Furthermore, computing device 400 may comprise an operating environment for the methods shown in FIGS. 2-3 above.

With reference to FIG. 4, a system consistent with an embodiment of the invention may include a plurality of computing devices, such as computing device 400. In a basic configuration, computing device 400 may include at least one processing unit 402 and a system memory 404. Depending on the configuration and type of computing device, system memory 404 may comprise, but is not limited to, volatile (e.g. random access memory (RAM)), non-volatile (e.g. read-only memory (ROM)), flash memory, or any combination or memory. System memory 404 may include operating system 405, one or more programming modules 406 (such as program module 407). Operating system 405, for example, may be suitable for controlling computing device 400's operation. In one embodiment, programming modules 406 may include, for example, a program module 407. Furthermore, embodiments of the invention may be practiced in conjunction with a graphics library, other operating systems, or any other application program and is not limited to any particular application or system. This basic configuration is illustrated in FIG. 4 by those components within a dashed line 420.

Computing device 400 may have additional features or functionality. For example, computing device 400 may also include additional data storage devices (removable and/or non-removable) such as, for example, magnetic disks, optical disks, or tape. Such additional storage is illustrated in FIG. 4 by a removable storage 409 and a non-removable storage 410. Computer storage media may include volatile and nonvolatile, removable and non-removable media implemented in any method or technology for storage of information, such as computer readable instructions, data structures, program modules, or other data. System memory 404, removable storage 409, and non-removable storage 410 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 400. Any such computer storage media may be part of device 400. Computing device 400 may also have input device(s) 412 such as a keyboard, a mouse, a pen, a sound input device, a camera, a touch input device, etc. Output device(s) 414 such as a display, speakers, a printer, etc. may also be included. The aforementioned devices are only examples, and other devices may be added or substituted.

Computing device 400 may also contain a network connection device 415 that may allow device 400 to communicate with other computing devices 418, such as over a network in a distributed computing environment, for example, an intranet or the Internet. Device 415 may be a wired or wireless network interface controller, a network interface card, a network interface device, a network adapter or a LAN adapter. Device 415 allows for a communication connection 416 for communicating with other computing devices 418. Communication connection 416 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both computer storage media and communication media.

As stated above, a number of program modules and data files may be stored in system memory 404, including operating system 405. While executing on processing unit 402, programming modules 406 may perform processes including, for example, one or more of the methods shown in FIGS. 2-3 above. The aforementioned processes are examples, and processing unit 402 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip (such as a System on Chip) containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, or other forms of RAM or ROM. Further, the disclosed methods' stages may be modified in any manner, including by reordering stages and/or inserting or deleting stages, without departing from the invention.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

I claim:

1. An exhaust gas heat energy recovery and pollution control system for a marine vessel, comprising:
   (a) an exhaust gas boiler that receives exhaust gases from a gas or fuel oil-burning internal combustion engine of 500 kW or more on the marine vessel, wherein the boiler produces usable steam-based power and heat from heat recovered from the exhaust gases;
   (b) a variable capacity wet scrubbing system that sprays a mixture into the exhaust gases, such that a temperature of the exhaust gases is lowered so as to prevent damage to a PTFE-based material, and wherein the mixture includes water and an optional reagent configured to remove or neutralize pollutants in the exhaust gases;
   (c) two or more condensing heat exchangers that receive exhaust gases, wherein the two or more condensing heat exchangers comprised of PTFE-based material that exhibits corrosion resistant and condensation promotion characteristics, wherein the two or more condensing heat exchangers produce usable power and heat from heat recovered from the exhaust gases, and wherein the reagent may additionally be added to exhaust gases exiting the two or more condensing heat exchangers;
   (d) a variable flow and variable pressure exhaust gas mover that facilitates movement of the exhaust gases via the exhaust gas boiler, the wet scrubbing system, the two or more condensing heat exchangers, and interconnecting piping, ducting, and appurtenances;
   (e) a liquid collection and treatment system that collects liquid condensate and spray from the two or more condensing heat exchangers and collection points, and adds a reagent configured to remove or neutralize pollutants in the liquid condensate and remove particulates;
   (f) one or more heat sinks to receive thermal energy from exhaust gases through the two or more condensing heat exchangers and exhaust gas boiler;

(g) an interconnecting fluid conduit that allows for movement of exhaust gases between the internal combustion engine, the exhaust gas boiler, the wet scrubbing system, the two or more condensing heat exchangers, and the exhaust gas mover, wherein the interconnecting fluid conduit includes at least one mechanism for preventing backflow of fluid to the exhaust gas boiler and the internal combustion engine; and (h) a control system communicatively coupled with a plurality of sensors control actuators, and external interfaces in the internal combustion engine, the exhaust gas boiler, the wet scrubbing system, the two or more condensing heat exchangers, an external power source for the system, the one or more heat sinks, the exhaust gas mover and the liquid collection and treatment system, wherein the control system collects data from the sensors and issues commands to the exhaust gas boiler, the wet scrubbing system, the two or more condensing heat exchangers, the exhaust gas mover and the liquid collection and treatment system based on the data received from the plurality of sensors.

2. The exhaust gas heat energy recovery and pollution control system of claim 1, wherein the control system is further configured for collecting data from the sensors, calculating an amount, temperature, and formulation of mixture to be injected by the wet scrubbing system based on the sensor data, and transmitting a control signal to the wet scrubbing system, wherein the control signal is configured to command the wet scrubbing system to inject the amount, temperature, and formulation of mixture that was calculated.

3. The exhaust gas heat energy recovery and pollution control system of claim 1, wherein the control system is further configured for transmitting one or more control signals for performing one or more of the following:
  controlling the temperature of the mixture sprayed by the wet scrubbing system;
  controlling the formulation of the mixture;
  controlling the gas mover to adjust gas mover throughput;
  providing safety limit warnings and controls in the event of a malfunction of one of the subsystems;
  managing and coordinating interaction of the internal combustion engine, the exhaust gas boiler, the wet scrubbing system, the one or more condensing heat exchangers, the exhaust gas mover;
  controlling power to and from the system;
  controlling liquid levels, flows, and temperatures, and
  managing, coordinating, and prioritizing one or more heat sink loops.

4. The exhaust gas heat energy recovery and pollution control system of claim 1, wherein the at least two condensing heat exchangers are configured to cool the exhaust gases from the gas or fuel oil-burning internal combustion engine to the temperature or relative humidity of ambient air at an outlet of the exhaust gas heat energy recovery and pollution control system.

5. The exhaust gas heat energy recovery and pollution control system of claim 1, wherein the at least two condensing heat exchangers are configured for receiving an excess steam dump of the marine vessel.

6. The exhaust gas heat energy recovery and pollution control system of claim 1, wherein the wet scrubbing system incorporates an emergency source of pressurized cooling water.

7. The exhaust gas heat energy recovery and pollution control system of claim 1, wherein heat energy from the exhaust gas heat energy recovery and pollution control system is used by a heat engine to produce power for the exhaust gas heat energy recovery and pollution control system.

8. An exhaust gas heat energy recovery and pollution control system for a marine vessel, comprising:
  (a) a device other than an exhaust gas boiler that receives exhaust gases from a gas or fuel oil-burning internal combustion engine of 500 kW or more on the marine vessel, wherein the device produces usable power from heat recovered from the exhaust gases;
  (b) a variable capacity wet scrubbing system that sprays a mixture into the exhaust gases, such that a temperature of the exhaust gases is lowered so as to prevent damage to a PTFE-based material, and wherein the mixture includes water and an optional reagent configured to remove or neutralize pollutants in the exhaust gases;
  (c) two or more condensing heat exchangers that receive exhaust gases, wherein the two or more condensing heat exchangers comprised of PTFE-based material that exhibits corrosion resistant and condensation promotion characteristics, wherein the two or more condensing heat exchangers produce usable power and heat from heat recovered from the exhaust gases, and wherein the reagent may additionally be added to exhaust gases exiting the two or more condensing heat exchangers;
  (d) a variable flow and variable pressure exhaust gas mover that facilitates movement of the exhaust gases via the exhaust gas boiler, the wet scrubbing system, the two or more condensing heat exchangers, and interconnecting conduits;
  (e) a liquid collection and treatment system that collects liquid condensate and spray from the two or more condensing heat exchangers and collection points, and adds a reagent configured to remove or neutralize pollutants in the liquid condensate and removes particulates;
  (f) one or more heat sinks to receive thermal energy from exhaust gases through the two or more condensing heat exchangers and exhaust gas boiler;
  (g) an interconnecting fluid conduit that allows for movement of exhaust gases between the internal combustion engine, the exhaust gas boiler, the wet scrubbing system, the two or more condensing heat exchangers, and the exhaust gas mover, wherein the interconnecting fluid conduit includes at least one mechanism for preventing backflow of fluid to the exhaust gas boiler and the internal combustion engine; and
  (h) a control system communicatively coupled with a plurality of sensors in the internal combustion engine, the exhaust gas boiler, the wet scrubbing system, the two or more condensing heat exchangers, an external power source for the system, the one or more heat sinks, the exhaust gas mover and the liquid collection and treatment system, wherein the control system collects data from the sensors and issues commands to the exhaust gas boiler, the wet scrubbing system, the two or more condensing heat exchangers, the exhaust gas mover and the liquid collection and treatment system based on the data received from the plurality of sensors.

* * * * *